United States Patent [19]

Van Der Schie

[11] 4,264,002
[45] Apr. 28, 1981

[54] DIVIDER SWITCH FOR ROLLER CONVEYORS

[75] Inventor: Donn Van Der Schie, Grand Haven, Mich.

[73] Assignee: Ermanco Incorporated, Spring Lake, Mich.

[21] Appl. No.: 906,698

[22] Filed: May 16, 1978

[51] Int. Cl.³ .................... B65G 47/24; B65G 47/52
[52] U.S. Cl. ................... 198/365; 198/361; 198/436; 198/79 D; 198/366
[58] Field of Search ............ 198/361, 365, 366, 372, 198/782, 436, 601, 781, 79 D; 193/36, 35 MD

[56] References Cited

U.S. PATENT DOCUMENTS

| | | | |
|---|---|---|---|
| 2,268,895 | 1/1942 | Olson | 193/36 |
| 2,566,417 | 9/1951 | Holm | 198/361 X |
| 3,058,567 | 10/1962 | Byrnes et al. | 198/361 |
| 3,272,298 | 9/1966 | Cato | 193/36 |
| 3,621,982 | 11/1971 | Fleischaver | 198/781 |
| 3,650,375 | 3/1972 | Fleischaver | 198/790 |
| 4,111,412 | 9/1978 | Cathers | 198/782 X |

*Primary Examiner*—Joseph E. Valenza
*Assistant Examiner*—Douglas D. Watts
*Attorney, Agent, or Firm*—Lockwood, Dewey, Alex & Cummings

[57] ABSTRACT

A divider switch for a roller conveyor selectively switches or displaces the lateral position of objects being conveyed to either separate or merge the objects. The switching apparatus is interposed in a live conveyor system. The divider switch includes a framework of longitudinal and transverse members; a plurality of transverse rollers at either end of the switch; a set of angularly movable rollers centrally located in the switch, the angularly movable rollers being of shorter length than the transverse rollers and switchable between at least two angular positions which define opposite acute angles relative to the transverse rollers; and two additional sets of rollers disposed on opposite sides of the angularly movable rollers, the additional sets of rollers being fixedly mounted to define opposite acute angles relative to the transverse rollers. A pivoting parallelogram frame and an actuating device, which may automatically respond to the objects, shift the angularly movable rollers between angular positions.

10 Claims, 9 Drawing Figures

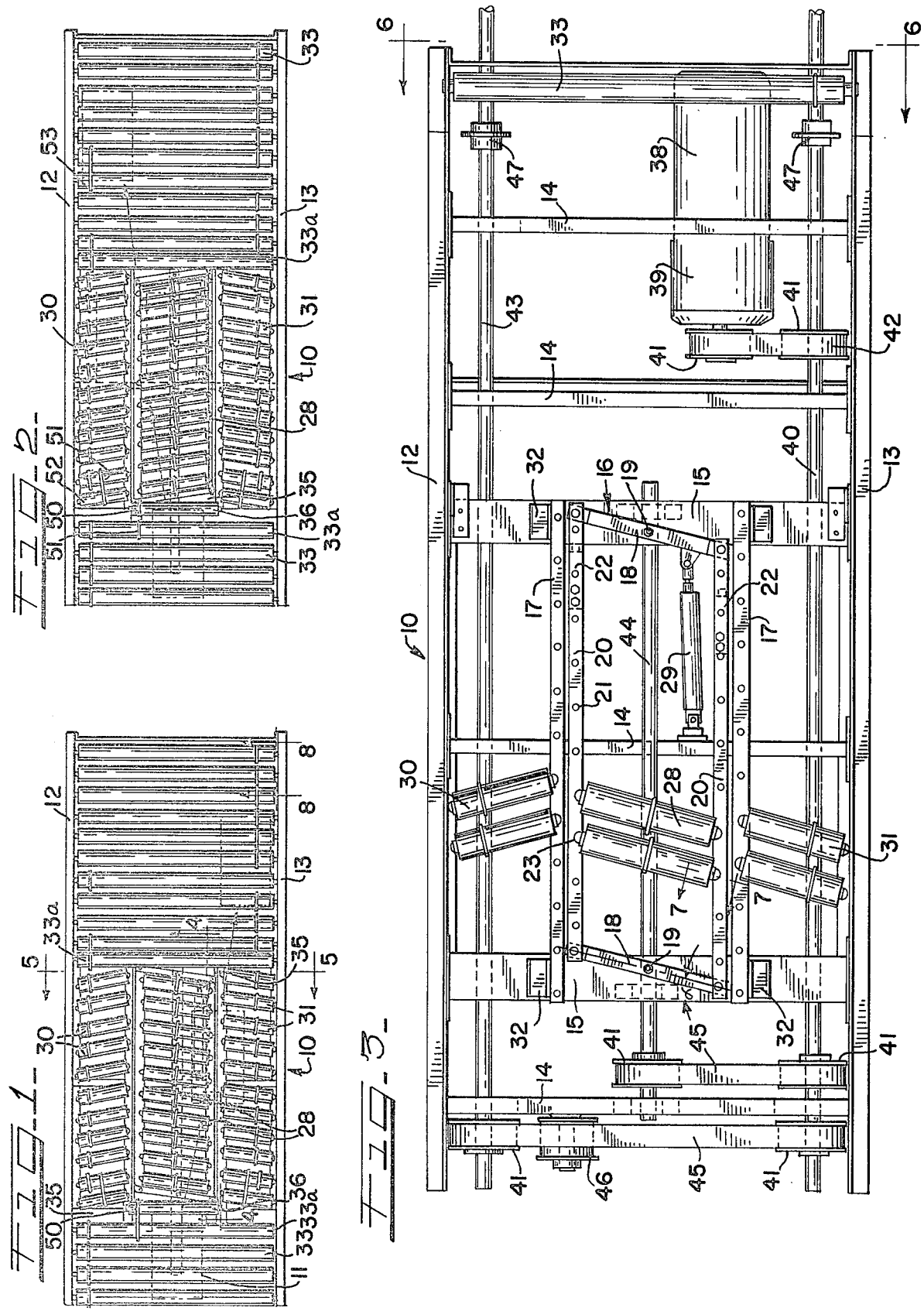

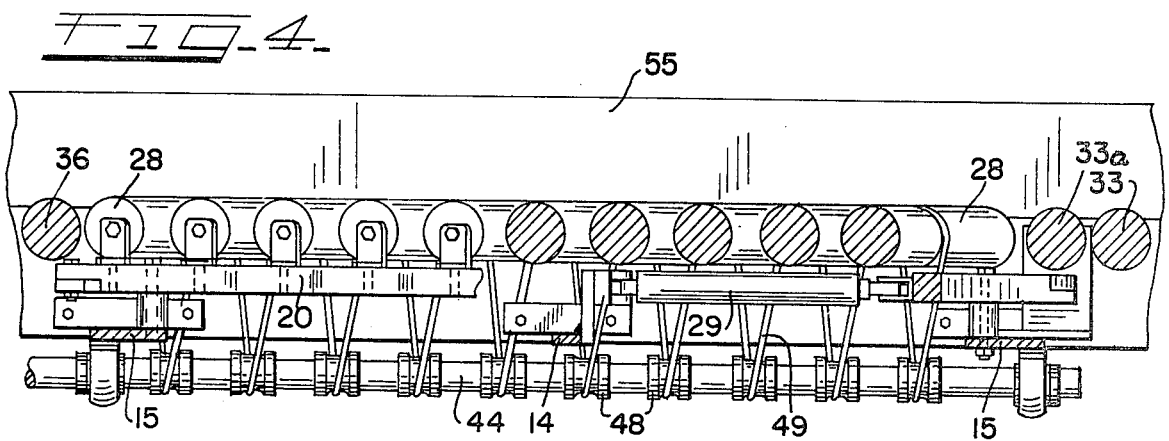
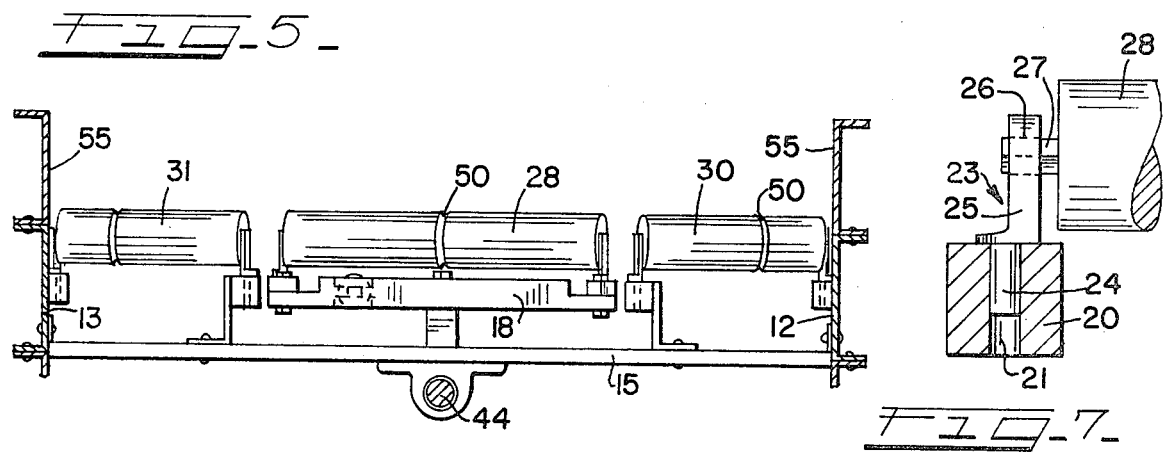
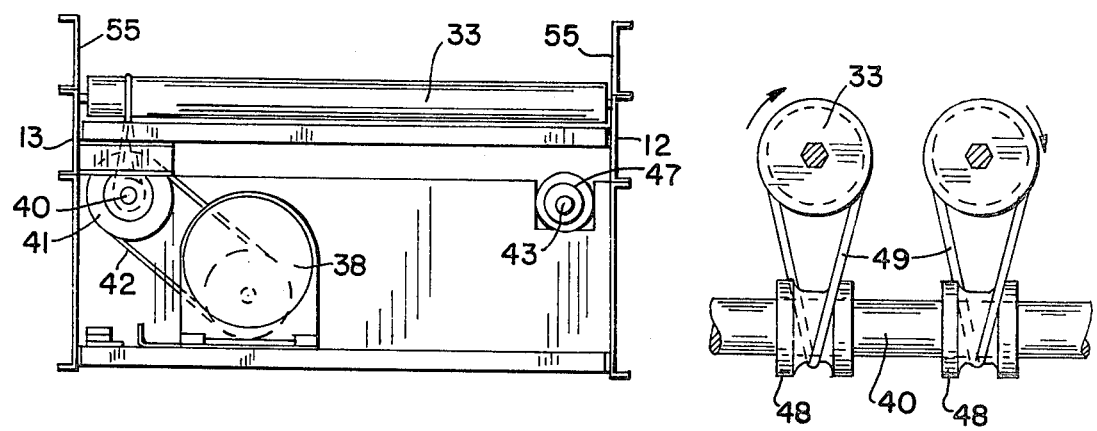

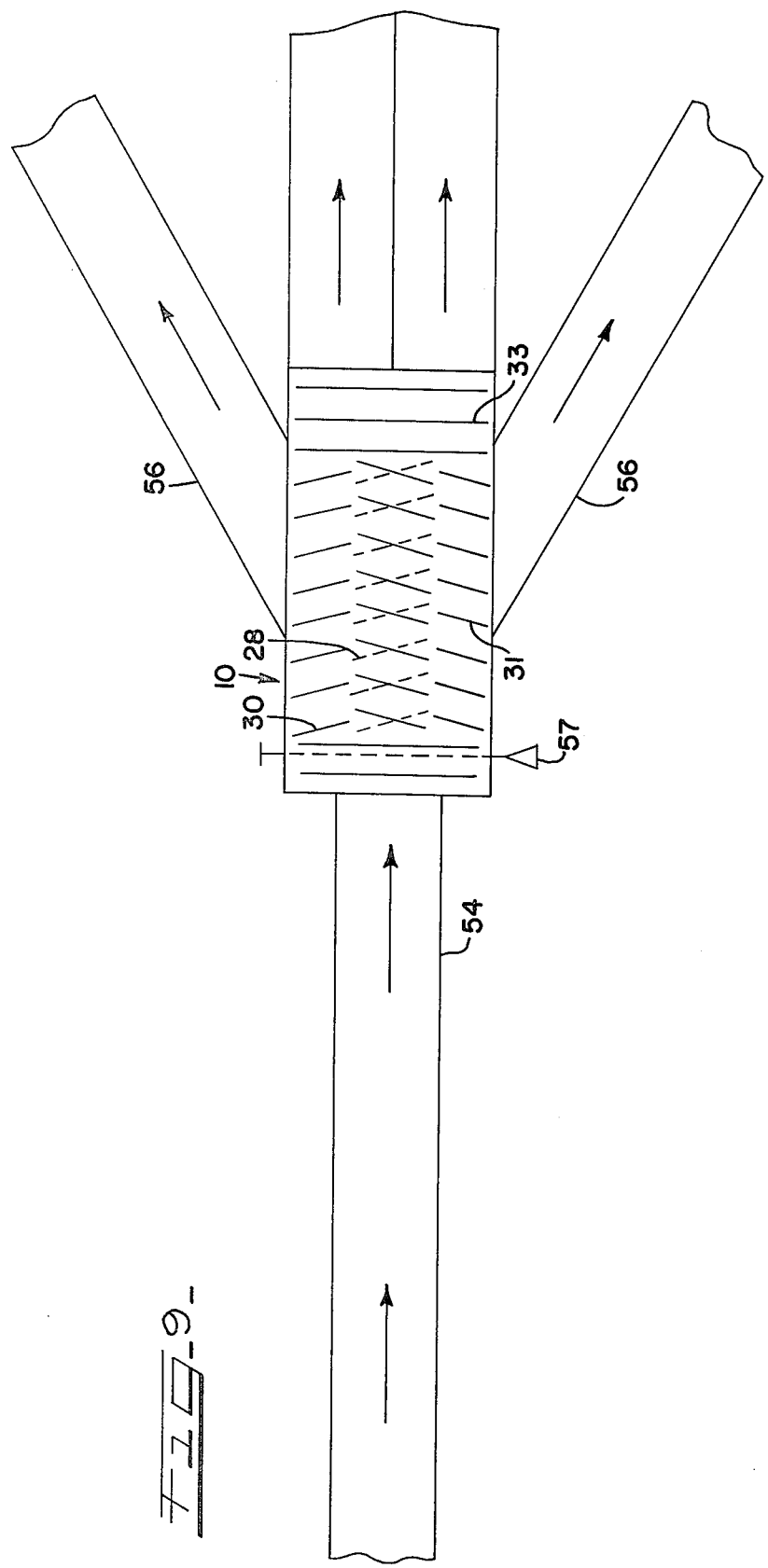

DIVIDER SWITCH FOR ROLLER CONVEYORS

BACKGROUND OF THE INVENTION

This invention relates in general to a divider switch for a live roller conveyor for separating, sorting or merging goods to be carried by the conveyor, and more particularly to such a divider switch with an angularly movable central set of rollers and with additional sets of rollers disposed on either side of the centrally located rollers at fixed angular positions for more conveniently, effectively and efficiently shifting the lateral position of the goods while moving across the divider switch.

Generally, most conventional conveyor systems move goods carried thereon longitudinally along the conveyor without appreciable lateral or transverse movement. Any significant lateral movement may require side rails which extend upwardly above the top surfaces of the rollers to contain the conveyed goods therebetween to prevent the goods from falling off the conveyor.

Divider switches for laterally shifting goods conveyed thereacross which utilize a single set of angularly movable rollers for spanning the full width of the conveyor line are known to the prior art. Such prior art divider switches suffer from the disadvantages that the angularly movable rollers cannot be shifted for a following object until the leading object has passed off of the divider switch, that the long angularly movable rollers leave large gaps where the angularly movable rollers interface with the transverse rollers of the conveyor system and that the large mass of the angularly movable set of rollers requires correspondingly large actuation devices which limit the operating speed of the divider switch and, hence, the conveyor system.

There is the need in modern material handling systems for efficient laterally shifting of goods in a controlled manner for a variety of reasons. It may be desirable to separate one type of goods from another. Where a conveyor branches into two or more separate conveyor lines, it is desirable to control the goods which pass onto each branch line. Similarly, where two or more branches merge into a single branch, it is necessary to merge the goods in an orderly fashion. Sometimes it is desirable to separate goods into at least two separate rows on a single conveyor line, as where the goods are removed from either side of the conveyor line. This latter instance often arises where material is manufactured or packaged faster than it can be removed from a single conveyor line for warehousing or shipment. Other sequences of industrial or manufacturing operations may require limited and controlled lateral shifting of the goods at some point in a conveyor system.

A principle object of the present invention is therefore to provide a divider switch for roller conveyors which effectively and efficiently shifts the lateral position of an object conveyed thereacross for diverging or merging conveyor lines or for separation or combining of the objects during movement across the divider switch.

A related object is to provide a divider switch with a first set of centrally located rollers which may be selectively moved between different acute angles in relation to the conveyor apparatus and two additional sets of rollers, one set on each side of the centrally located rollers with each additional set of rollers forming fixed acute angles with respect to the conveyor apparatus. As the center of gravity of an object passes from the centrally located rollers to one of the additional sets, the centrally located rollers may be moved to an opposite acute angular position, if desired, to begin moving a succeeding object to an opposite angular position before the leading object has completed movement through the divider switch. Thus, the distance between leading and succeeding objects may be significantly reduced which enables a conveyor system to achieve higher product density and therefore, greater output.

Another object of the present invention is to provide a divider switch with a set of rollers which are movable between at least two angular positions in relation to the conveyor apparatus and which are shorter than the nominal width of the conveyor lines such that the angularly movable set of rollers is of reduced mass and may be more efficiently and rapidly switched between angular positions.

Yet another object is to provide such a divider switch which significantly reduces a triangular shaped gap between the last transverse roller of the divider switch and the first angularly movable roller of the divider switch.

A further object is to provide a divider switch which may be automated to respond to differing characteristics of objects, or to codes printed thereon, for automatic shifting of the objects to the desired location.

It is further intended to provide a divider switch of the above description which is operable in either forward or reverse directions.

SUMMARY OF THE INVENTION

The divider switch of the present invention selectively shifts the lateral positions of objects conveyed thereacross to either diverge objects from a single path into multiple paths or to merge objects from multiple paths into a single path. A first set of angularly movable rollers is centrally located in the divider switch with ends of the rollers pivotally supported upon a parallelogram type frame. Actuating means selectively moves the parallelogram frame and the first set of rollers to orient the rollers at different angles in relation to transverse rollers of the conveyor system. As objects move across the first set of rollers, the objects will move in a path of least resistance which is the path normal to the axis of the rollers. Thus, the distance that objects will be laterally shifted is dependent upon the angle formed between the transverse rollers and the angularly movable rollers and also upon the length of the set of angularly movable rollers.

Two sets of rollers are disposed, one set on each side of the centrally located and angularly movable rollers of the divider switch. As an object is conveyed by the set of centrally located rollers of the divider switch, said object is gradually shifted in lateral position. When the center of gravity of the object is transferred by the lateral shifting over an end of one of the rollers of the set disposed alongside the centrally located rollers, the centrally located rollers may be switched to a different angular position, if desired, for the next succeeding object. Thus, in the present invention, the leading object need not pass entirely through the divider switch before the next succeeding object begins to enter the divider switch. The leading object need only be shifted to one of the two sets of rollers disposed alongside the centrally located rollers. The distances between objects being conveyed on a conveyor system incorporating the divider switch of this invention may therefore be reduced with the attendant advantages of greater object density on the conveyor system and a higher operating efficiency of the divider switch.

Due to the shorter width of the centrally located set of rollers in the divider switch, the triangular gaps which are formed between the last transverse roller and the first angularly positioned roller of the centrally located set is also significantly reduced. If desired, this gap may be further reduced by disposing a transverse roller in the gap, with the length of the additional transverse roller approximately equal to the length of one of the rollers in the centrally located set.

Various other objects, features and advantages of the invention will become apparent from the following detailed disclosure when taken in conjunction with the drawings.

BRIEF DESCRIPTION OF THE DRAWINGS

In the drawings:

FIG. 1 is a top plan view of a divider switch embodying the present invention with the centrally located set of rollers at an acute angle relative to the transverse rollers and further illustrating the lateral position of an object before it moves through the divider switch, and afterwards;

FIG. 2 is a top plan view of the divider switch of FIG. 1 with the centrally located set of rollers at an opposite acute angle relative to the transverse rollers and showing opposite lateral movement of an object as it passes through the divider switch;

FIG. 3 is a top plan view of the divider switch of FIG. 1 with most of the rollers removed for better illustrating the framework and drive system;

FIG. 4 is a side elevation in section taken along section line 4—4 of FIG. 1;

FIG. 5 is a rear elevation in section taken along section line 5—5 of FIG. 1;

FIG. 6 is a rear elevational view of the structure shown of FIG. 1;

FIG. 7 is an elevational view in section taken at section line 7—7 in FIG. 3 of the pivotal connection between a portion of the divider switch frame and the end of a centrally located roller;

FIG. 8 is an enlarged partial side elevation of the drive system for the live rollers of the divider switch; and FIG. 9 is a diagrammatic plan view of the divider switch in conjunction with roller conveyor lines.

DESCRIPTION OF THE PREFERRED EMBODIMENT

Turning now to the drawings, there is shown in FIGS. 1 and 2 an exemplary divider switch, generally designated 10, for use in conjunction with a roller conveyor, such as that disclosed in U.S. Pat. No. 3,621,982, issued on Nov. 23, 1971 and assigned in part to the assignee of this invention.

The basic framework for the divider switch 10 is shown in the plan view of FIG. 3. A pair of longitudinal side rails 12,13 are maintained in a parallel and spaced apart relationship by a plurality of perpendicular or transverse cross members 14. Disposed at spaced positions intermediate ends of the divider switch 10 are larger cross members 15 for supporting a parallelogram switch frame 16 and a pair of roller support bars 17. Opposite end members 18 of the parallelogram switch frame 16 are pivotally supported by the cross members 15 at midpoint apertures 19 in the members 18. Ends of the members 18 are in turn pivotally connected to ends of a pair of longitudinal members 20 to complete the parallelogram switch frame 16. The longitudinal members 20 are provided with a plurality of apertures 21 at spaced points therealong.

Turning to FIG. 7, there is shown a sectional view of the longitudinal member 20 with a roller support, generally designated 23, having a cylindrical end portion 24 inserted into the aperture 21 to also provide a pivotal connection. The support 23 has an upstanding portion 25 with a hexagonal aperture 26 therethrough for receiving the hexagonal shaft 27 of a conveyor roller 28. The roller support 23 is fabricated from a material exhibiting low frictional resistance to pivoting in the apertures 21. If a material such as glass filled nylon is used for the roller support 23, the need for frequent lubrication may also be avoided.

It will now be appreciated that due to the pivotal connections in the parallelogram frame 16 (FIG. 3) at the apertures 19, at the ends of the members 18,20 and at the roller supports 23 in the apertures 21, that the angular position of the rollers 28 will change as pivotal movement occurs in the parallelogram frame 16. To this end, an actuating device 29, such as an air cylinder, is mounted between one of the cross members 14 and one of the end members 18 of the parallelogram frame 16 for movement of the rollers 28 between at least two angular positions. Preferably the parallelogram frame 16 and the set of angularly movable rolles 28 are centrally located in the divider switch 10 between the side rails 12,13. Resilient stops 22 depend downwardly from the longitudinal members 20 of the parallelogram frame 16 to engage against cross member 15 to limit the angular movement of the parallelogram frame 16 and the associated rollers 28.

According to another aspect of the invention, the centrally located rollers 28 are significantly shorter than the distance between the side rails 12,13 such that two additional sets of rollers may be disposed between the side rails 12,13 and the set of rollers 28. That is, one of the additional sets of rollers 30 is disposed between the centrally located set of rollers 28 and side rail 12 and the other set of additional rollers 31 is disposed between the other side of the centrally located set of rollers 28 and the side rail 13. Preferably, the additional sets of rollers 30,31 are slidably adjusted at brackets 32 which are mounted to cross members 15 for fixedly securing the roller support bars 17 such that the sets of rollers 30,31 will assume opposite acute angular positions relative to the cross members 14,15. Thus, when the centrally located pivotal set of rollers 28 is in a first angular position, the set of rollers 28 is in substantial angular alignment with the additional set of rollers 31. As can be better seen in FIG. 2, when the centrally located set of rollers 28 is in an opposite angular position, the set of rollers 28 is in substantial angular alignment with the other set of additional rollers 30.

Since the sets of rollers 28,30,31 will not typically occupy the entire length of the divider switch 10, a plurality of transverse rollers 33 may be provided at either end of the divider switch 10 with the rollers 33 extending between the side rails 12,13. The top edges of the rollers 20,30,31,33 define a common planar surface, also known in the conveyor art as the pass line, over which objects are conveyed.

Triangular shaped gaps 35 (FIGS. 1 and 2) will be formed between the sets of rollers 28,30,31 and those transverse rollers 33a which are immediately adjacent to the sets of rollers 28,30,31. It will be appreciated that the size of the triangular gaps 35 will depend upon the angular displacement between the transverse rollers 33 and the sets of rollers 28,30,31, as well as the width of the sets of rollers 28,30,31. If the triangular gaps 35 are sufficiently large in relation to the size or type of goods being conveyed, the gaps 35 may be partially filled by a shorter transverse roller 36 in a manner which will not interfere with the pivoting action of the set of rollers 28. Such shorter transverse rollers 36 may be mounted to and supported by cross member 15.

The invention is used to best advantage in a live roller conveyor wherein each of the rollers 28,30,31,33,36 are rotated by a power source. A motor 38 (FIGS. 3 and 6) may also include a gear reduction portion 39 to adapt the speed of the motor 38 to the desired speed of the conveyor system. A main drive shaft 40 longitudinally extends along the side rail 13 and is supported by bearings downwardly depending from cross members 14, in a manner similar to that shown in FIG. 5. The drive shaft 40 is rotatably connected to the motor 38 by pulleys 41 and a belt 42. The pulleys 41 and belt 42 are preferably of the gear belt type for positive, non-slipping rotative movement. The drive shaft 40 is also rotatably connected to a line shaft 43 which longitudinally extends along the side rail 12 and to a centrally located line shaft 44 which longitudinally extends along a centerline defined by the set of rollers 28. Pulleys 41 and belts 45, also of the gearbelt type, rotatably connect the shafts 40,43,44. A belt tightener 46 may be employed to remove any slack from the belt 45.

The pulleys 41 will generally be of the same size such that the shafts 43,44 will rotate at the same speed as the drive shaft 40. Couplings or flanges 47 may be provided at ends of the shafts 40,43 to drive other portions of a conveyor system at the same speed. However, it will be appreciated that it may be desirable in some instances to drive the divider switch 10, or portions thereof, at differing speeds.

Turning to FIGS. 4 and 8, there is shown the drive arrangement for driving each of the rollers 28,33,36 from the shafts 40,44. Spaced along the length of the drive shaft 40 and the line shafts 43,44 are a plurality of friction spools, one for each associated roller 28,30,31,33. The spools 48 are not rigidly fitted to the shaft 40,43,44, but are instead provided with a small amount of clearance so that they may slip when required. Power is transferred from each spool 48 to its associated roller 28,30,31,33 through a resilient elastomeric drive belt 49 such as an O-ring. The belt 49 is looped around the spool 48, turned or twisted through 90 degrees, and looped over a corresponding groove 50 in the rollers 28,30,31,33. The elastomeric properties of the belt 49 apply a preload between the spool 48 and the associated roller, tending to pull the spool 48 toward the associated roller. This preload provides a controlled degree of coupling friction between the shaft 40,43,44 and the spool 48. Under ordinary operating conditions, there will be a nonslipping transmission of power to each roller 28,30,31,33. Under abnormal loading on any one of the rollers 28,30,31,33, the friction connection between the spool 48 and the shaft 40,43,44 will break, stopping such roller 28,30,31,33 while the shaft 40,43,44 continues to turn and to drive the remaining rollers 28,30,31,33 on the conveyor.

From the prior description of the parallelogram switch frame 16 and the angularly movable rollers 28, it will readily be appreciated that ends of the rollers 28 move during the pivoting action while the center of the rollers 28 remains in essentially the same location. The line shaft 44 for driving the rollers 28 is therefore disposed below and along a longitudinal centerline defined by the set of rollers 28 (FIGS. 3 and 5) such that the pivoting action of the rollers 28 does not interfere with the means for driving the rollers 28.

Because of obstructions caused by the framework and the like between the shafts 40,43,44 and the rollers 28,30,31,33,36, certain rollers may be driven in a slaving manner. For example, the shorter transverse roller 36 is mounted above cross member 15 and may be driven by an elastomeric ring extending from groove 50 in the roller 36 to an adjacent transverse roller 33. The adjacent roller 33 is provided with an additional groove 51 (FIG. 2) which is in generally parallel alignment with the groove 50 in the roller 36. Similarly, in the sets of rollers 30,31 one of the end rollers 52 may overlie cross member 15 and may be driven from an adjacent roller 30,31 which is also provided with an additional groove 51. The transverse rollers 33 may be generally driven from either of the shafts 40,43 except for one of the rollers 53 which overlies the pulley 41 on shaft 40. This roller 53 must be driven from shaft 43.

With the detailed description of the divider switch 10 largely presented above, the operation thereof may now be better understood, particularly with reference to FIGS. 1, 2 and 9. An incoming object 11 to the divider switch 10 is centered relative to the divider switch 10 such that the object 11 will begin to pass over the centrally located rollers 28 after passing over the transverse rollers 33. Various means of centering the objects 11 preparatory to moving into the divider switch 10 can be utilized. One method is to use the divider switch 10 in conjunction with a narrower incoming conveyor section 54 (FIG. 9) such that objects 11 will be centered relative to the divider switch 10 and the centrally located rollers 28. The conveyor section 54 does not need to be narrower than the length of the rollers 28, but only sufficiently narrow that a larger portion of the object 11 initially contacts the rollers 28, rather than the rollers 30,31 such that the rollers 28 have control over the direction of the object 11. As seen in FIG. 1, as the object 11 begins to pass over the rollers 28, the object 11 will begin to shift laterally with respect to the divider switch 10. This phenomenon occurs because the object 11 will move in the path of least resistance which is perpendicular to the rollers 28. Because the rollers 28 are disposed at an acute angle relative to the transverse rollers 33 or the cross members 14,15, the object 11 will move at a similar angle to the normal longitudinal conveyor path. As the center of gravity of the object 11 begins to move from the rollers 28 to the adjacent set of rollers 31, the path of the object 11 will be controlled by the rollers 31 and the rollers 28 may therefore be shifted to the opposite angular position, as in FIG. 2, if the next upstream object 11 is to be shifted to an opposite lateral position. It is important to note that the present invention permits a higher speed of operation of the divider switch 10 since the prior object 11 need not pass off of the rollers 31 and onto the transverse rollers 33 before the set of rollers 28 may be shifted to an opposite angular position for shifting of the next object to an opposite lateral position. For optimum operation, the axial length of the rollers 28 is as short as possible for the type and size of goods being conveyed. When the rollers 28 are as short as is feasible, the goods move off the rollers 28 and onto either set of side rollers 30,31 at an earlier time thereby permitting faster operation of the divider switch 10 and greater product density.

It will be appreciated that the amount of lateral shifting or displacement of the object 11 as it passes through the divider switch 10 is controlled both by the length of the sets of rollers 28,30,31, i.e. the length as measured along the side rails 12,13, and the angular orientation of the rollers 28,30,31 from the transverse rollers 33. In order to achieve a divider switch of practical length, the angular orientation of the rollers 28,30,31 from the transverse rollers 33 or from the transverse members 14,15 (identified by the angles α in FIG. 3) is preferably about 15 degrees, although angular orientations of up to 45 degrees may be desired in some instances. Also depending upon the application, the divider switch 10 may be equipped with upwardly extending side rail portions 55, extending upwardly from the common plane defined by the top surfaces of the rollers 28,30,31,33,36, such that objects 11 are not shifted off of the divider switch 10 when moving across the sets of rollers 30,31, but are instead contained upon the divider switch 10. The upwardly extending side rails 55 may be fabricated from a variety of materials which exhibit low frictional resistance, such as polytetrafluoroethylene, or from metallic sheet stock coated with such a low frictional resistance material.

The dividing or separating function achieved by the divider switch may be useful for separating goods into two different rows along the same conveyor line as shown in FIG. 9 or for moving the goods onto a branch conveyor line 56 adjacent either of the sets of rollers 30,31. It will be readily appreciated that use of more than one divider switch 10 can greatly increase the number of separation possibilities. The invention may be used to even greater advantage with a sensing device 57 for sensing the type of goods being conveyed across the divider switch 10 and controlling the actuator device 29 to change the angular position of the rollers 28, thereby automatically controlling separation of the goods. The sensing device 57 may be positioned and responsive to a source of light to distinguish between the size of packages or to count the packages. Similarly, the sensing device 57 could be responsive to weight, color, or other indicia which distinguishes the type of objects and responds thereto to control the lateral movement in the divider switch 10. The sensor could also be responsive to codes printed on objects, such as the so-called "zebra" codes which are currently printed on many goods for identification by data processing equipment for various purposes. Another application is where manufacturing operations occur at a faster rate than packaging or shipping operations. In this instance, the sensing device 57 may alternatively cause the rollers 28 to change angular position for each succeeding object 11 to simply and efficiently divide the objects 11 into two separate rows for the slower packaging or shipping operations while permitting the manufacturing operations to be maintained at a much higher rate.

Since the divider switch 10 has its own power drive system, the motor 38 could be of the reversible type thereby enabling the divider switch 10 to operate in either direction. That is, besides the separating or dividing function described above, the divider switch 10 could also be operated in the other direction to merge objects 11 from a plurality of conveyor lines.

It will be understood that various changes and modifications may be made without departing from the spirit of the invention as defined in the following claims, and equivalents thereof.

I claim:

1. A divider switch adapted for use in a roller conveyor system for selectively displacing the lateral position of an object being conveyed thereacross, said divider switch comprising:

framework means including a pair of spaced apart and generally parallel longitudinal members and a plurality of transverse members disposed therebetween;

angularly movable switching means including a set of centrally located and angularly movable rollers, the longitudinal axis of each of the rollers being in generally parallel relation to axes of other rollers in the set, said rollers being of equal axial length and of substantially shorter axial length than said transverse members and being disposed at a generally central location between said pair of longitudinal members, said rollers also having sufficient axial length to control movement of said object in a direction normal to the axes of said rollers;

means for supporting said centrally located rollers, said supporting means freely movable between at least two positions thereby causing the longitudinal axes of said rollers to be oriented at different angular positions in relation to the transverse members of said framework means;

actuating means for selectively moving said supporting means between said at least two positions to cause movement of said set of rollers between said different angular positions;

two additional sets of rollers with the rollers in each set being of equal axial length, a first additional set of rollers being located alongside said set of centrally located rollers between said set of centrally located rollers and one of said pair of longitudinal members, and a second set of additional rollers being located along an opposite side of said set of centrally located rollers between said set of centrally located rollers and another of said pair of longitudinal members, said additional sets of rollers being fixedly oriented at opposite acute angles in relation to the transverse members of said framework means; and drive means operatively connected with said centrally located rollers and said additional sets of rollers for driving said rollers with the same rotative movement;

said additional sets of rollers and said set of centrally located rollers defining a common substantially coplanar conveying surface;

whereby said set of centrally located rollers may be selectively moved to a different angular position upon a leading object having laterally moved sufficiently upon one of said additional sets of rollers to cause a succeeding object to be conveyed in a different path across the divider switch before the leading object has been conveyed across said one of the additional sets of rollers and off of said divider switch.

2. The divider switch as defined in claim 1 wherein said additional sets of rollers are oriented at an acute angle in the range of 15 degrees to 45 degrees as defined by the angular separation between the longitudinal axis of one of said rollers and one of said transverse members.

3. The divider switch as defined in claim 1 wherein each of the rollers of the set of angularly movable and centrally located rollers is in substantially parallel alignment with each of the rollers of the first set of additional rollers when said angularly movable rollers are oriented in a first angular position and each of the rollers of said set of angularly movable rollers is in substantially parallel alignment with each of the rollers of said second set of additional rollers when said angularly movable rollers are oriented in a second angular position.

4. The divider switch as defined in claim 1 further comprising a plurality of transverse rollers extending between the longitudinal members of said framework means, said transverse rollers being disposed at either end of the set of angularly movable rollers and the two sets of additional rollers and in generally coplanar relationship therewith, and said drive means being operatively connected with said plurality of transverse rollers for driving the same with the same rotative movement that said centrally located rollers and said additional sets of rollers are driven.

5. The divider switch as defined in claim 4 further comprising an additional transverse roller of shorter length than said transverse rollers, said shorter transverse roller disposed in a gap between one of the transverse rollers and one of the angularly movable rollers for reducing the size of said gap.

6. The divider switch as defined in claim 5 wherein said shorter transverse roller is rotatably connected to said one of the transverse rollers.

7. The divider switch as defined in claim 1 further comprising resilient stop means for limiting the maximum angular position of said supporting means in relation to one of said transverse members such that movement of said supporting means is automatically stopped when the set of angularly movable rollers is in substantially parallel alignment with one of the two sets of additional rollers.

8. The divider switch as defined in claim 1 wherein said supporting means comprises a pair of end members and a pair of longitudinal members, said end and longitudinal members pivotally connected at ends thereof to define a parallelogram switch frame, said end members pivotally connected to a pair of transverse members of framework means near midpoints of said end members, said longitudinal members provided with a plurality of apertures at spaced points therealong, and a plurality of roller supports, one for each end of each roller of the set of angularly movable rollers, said roller supports engaging the apertures in said longitudinal members for pivotal connection therewith.

9. The divider switch as defined in claim 1 further comprising upwardly projecting side rails along the longitudinal members of the framework means for containing said object on said divider switch while moving thereacross.

10. The divider switch as defined in claim 1 wherein the drive means for said set of angularly movable rollers comprises a rotatable line shaft disposed below and along a longitudinal centerline defined by said set of angularly movable rollers and means interconnecting said line shaft with the center of each roller of said set of angularly movable rollers for rotative movement of same.

* * * * *